United States Patent [19]

Simon

[11] Patent Number: 4,787,841
[45] Date of Patent: Nov. 29, 1988

[54] SPRUE EJECTOR IN AUTOMATIC INJECTION MOLDING MACHINES

[76] Inventor: Hans Simon, Bruchhausener Str., D-5463 Unkel, Fed. Rep. of Germany

[21] Appl. No.: 125,227

[22] Filed: Nov. 25, 1987

[30] Foreign Application Priority Data

Dec. 2, 1986 [DE] Fed. Rep. of Germany ....... 3641135

[51] Int. Cl.⁴ .............................................. B29C 45/42
[52] U.S. Cl. .................................... 425/556; 264/161; 425/436 R; 425/438; 425/444
[58] Field of Search ................... 425/554, 556, 436 R, 425/436 RM, 438, 444; 264/161

[56] References Cited

U.S. PATENT DOCUMENTS

| | | | |
|---|---|---|---|
| 2,330,369 | 9/1943 | Marsh ................................. | 425/554 |
| 3,028,629 | 4/1962 | Focht et al. ........................ | 425/556 |
| 4,085,178 | 4/1978 | McNeely et al. ................... | 264/161 |
| 4,124,352 | 11/1978 | Pasch ................................. | 425/556 |
| 4,239,476 | 12/1980 | Somberg ........................... | 425/556 |
| 4,715,806 | 12/1987 | Ehrler et al. ...................... | 425/556 |

Primary Examiner—Jay H. Woo
Assistant Examiner—Timothy W. Heitbrink

[57] ABSTRACT

An apparatus for removing the sprue from an injection mold, having a cylinder and an associated piston rod, in which the piston rod extends between the two halves of the mold into the runner when the injection mold is closed. Molding material is molded around the forward end of the piston rod during the injection. Upon opening of the mold the sprue fixedly carried by the forward end is removed by movement of the piston rod into the cylinder.

12 Claims, 3 Drawing Sheets

SPRUE EJECTOR IN AUTOMATIC INJECTION MOLDING MACHINES

BACKGROUND OF THE INVENTION

This invention relates to apparatus for removing the sprue from an injection mold, comprising a cylinder and an associated piston rod.

In the previously known apparatus of that kind a gripping implement is mounted on the end of the piston rod. When the mold has been opened the apparatus is actuated so that the gripper grips the now exposed sprue and then deposits said sprue outside the automatic injection molding machine. For this reason the function of the sprue gripper cannot be initiated until the halves of the mold have been sufficiently moved apart. This results in a time delay. Besides, the gripper mechanism is rather complicated and expensive.

The mechanism for pivoting and lifting the gripper is correspondingly large, complicated, and expensive and requires a lot of maintenance work. This is particularly due to the fact that the apparatus is mounted on the stationary bridge or on the stationary platen.

In view of the above it is an object of the invention to provide a sprue ejector which is of the kind described and which is structurally simple and inexpensive and is absolutely reliable in operation and has a function that is integrated in the injecting operation.

SUMMARY OF THE INVENTION

This object is accomplished in accordance with the invention in that the piston rod extends between the two mold halves into the runner when the injection mold is closed. During the injection operation, molding material is molded around the piston rod at its forward end.

When the injection mold has been opened, the sprue is fixedly carried by the forward end of the piston rod so that the sprue will be removed, i.e., ejected, by an operation of the cylinder.

The cylinder and the piston rod can be adjusted in three mutually orthogonal directions and can be fixed in position with known means. The lifting cylinder or the piston rod can be adjusted to such a position that the piston rod extends in the parting line between the halves of the mold into the runner.

The cylinder is preferably connected to the movable platen. This can readily be accomplished because the apparatus is relatively small and simple in structure. As a result, the ejecting apparatus will move in unison with the movable mold half, so that the positioning and the movements for effecting the ejection will be particularly simple.

The piston rod is preferably guided in a guiding and stripping sleeve, which is mounted at the forward end of the cylinder. When the operation of the cylinder is initiated, the piston rod together with the sprue is first removed from the region between the mold halves. As soon as the sprue strikes against the forward end of the guiding and stripping sleeve, the sprue will be stripped from the piston rod.

If that simple movement is not permitted by the space conditions, the cylinder and the sprue can be moved farther away from the region of the injection molding machine by a pivotal movement. For that purpose the cylidner is pivoted on an axle or shaft that is mounted on the movable platen.

BRIEF DESCRIPTION OF THE DRAWING

An illustrative embodiment of the invention will now be described with reference to the drawing.

DESCRIPTION OF PREFERRED EMBODIMENTS

Figure 1:
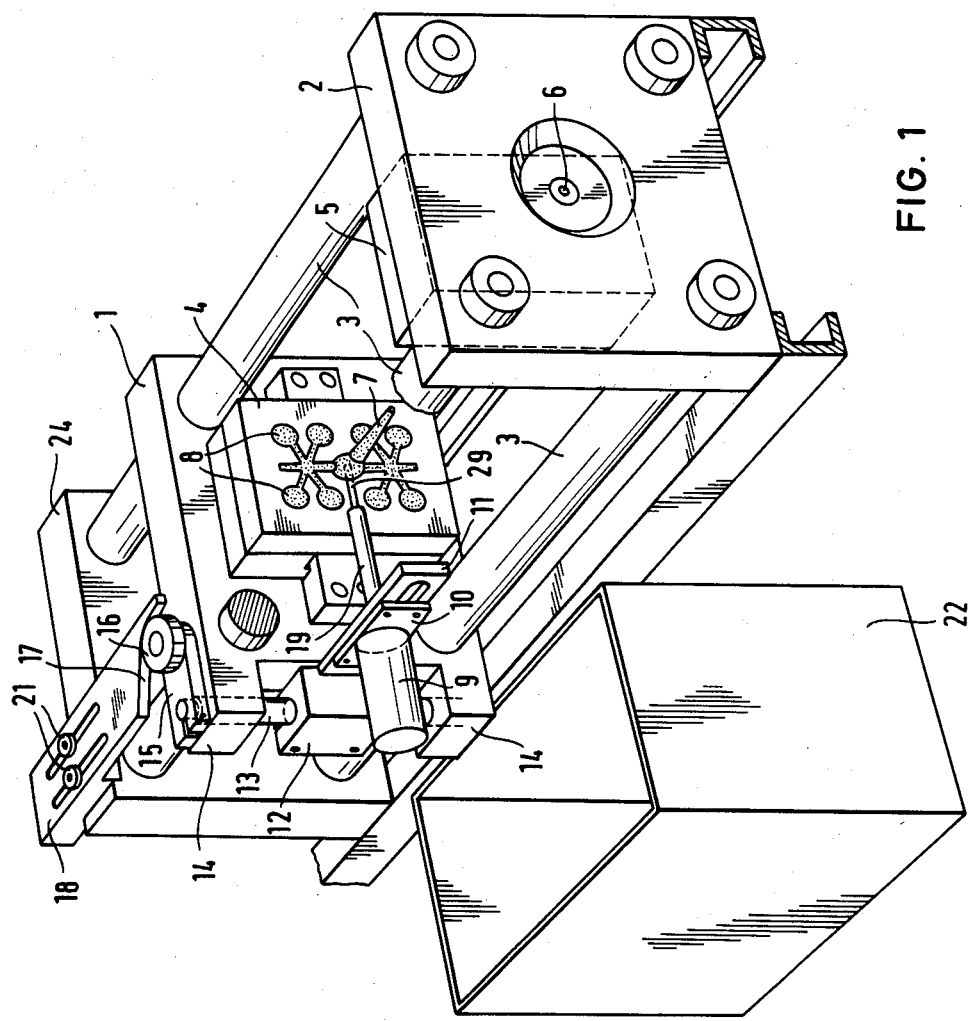
FIG. 1 shows a sprue ejector in accordance with the invention when the mold halves of an automatic injection molding machine are opened and the ejector is in the position before the ejection.

A platen 1 is movably mounted on four guide bars 3 between two stationary bridges 2 and 24. The movable mold half 4 is secured to the platen 1. The stationary mold half 5 provided with the runner 6 is secured in the stationary bridge 2.

In FIG. 1 the mold half 4 has been moved to a position in which the mold is 75% open so that the moldings 8 and the protruding sprue 7 are visible.

The ejecting apparatus in accordance with the invention is provided on one side of the movable platen 1 (on the left on the drawing). A cylinder 9 is provided with a piston rod 29 and is adjustable in three planes relative to the injection mold and adapted to be fixed in position. The piston rod 29 is movably mounted in a guide tube 19, which is attached to the cylinder 9 at its forward end.

In accordance with FIG. 1 the lifting cylinder 9 extends transversely to the guide bars 3 and is so adjusted relative to the mold that the piston rod 29 extends in the plane between the two mold halves 4, 5 when the mold halves have been closed during the injecting operation and the forward end of the piston rod then extends into the runner.

As the plastic material is injected to flow through the runner into the mold cavities, the plastic material will be molded around the forward end of the piston rod 29. When the injection mold has been opened the sprue can be removed by means of the piston rod from the space between the mold halves.

The cylinder 9 extends transversely to an arm 11, which extends in the direction of the guide bars 3. The cylinder 9 is adjustable along the arm 11. The depth of penetration of the forward end of the piston rod 29 can be adjusted by a clamping device on a carrier plate 10, which is interposed between the cylinder 9 and the arm 11. The arm is mounted on a bushing 12, which is axially adjustable on a shaft 13. The shaft 13 is movably mounted in two bearings 14, which are provided on the movable piston 1. A lever arm 15 is mounted on the shaft 13 at one end thereof and is adjustable and adapted to the fixed in position and at its free end carries a roller 16. The roller 16 cooperates with a cam 17, which is provided on the protruding end of a crossbeam 18, which is adjustably mounted on the bridge 24 by means of slots and clamp screws 21.

When the mold is closed, the free end of the piston rod 29 associated with the cylidner 9 extends in the parting line between the mold halves 4, 5—as has been mentioned—and the molding material is molded around said free end in the runner 6 so that the sprue 7 is joined to the end 29 of the piston rod. As the platen 1 is moved toward the stationary bridge 24 to open the mold, ejectors are actuated in the conventional manner shortly before the mold has been opened as far as possible. Said ejectors sever the moldings from the sprue and force the sprue out of the sprue channels.

If it is possible in view of the space conditions, only the cylinder 9 is operated to retract the free end 29 of the piston rod so that the sprue 7 is moved to a position beside the mold and is stripped by the stripping and guiding sleeve 19 and subsequently drops into a collecting bin.

Figure 2:
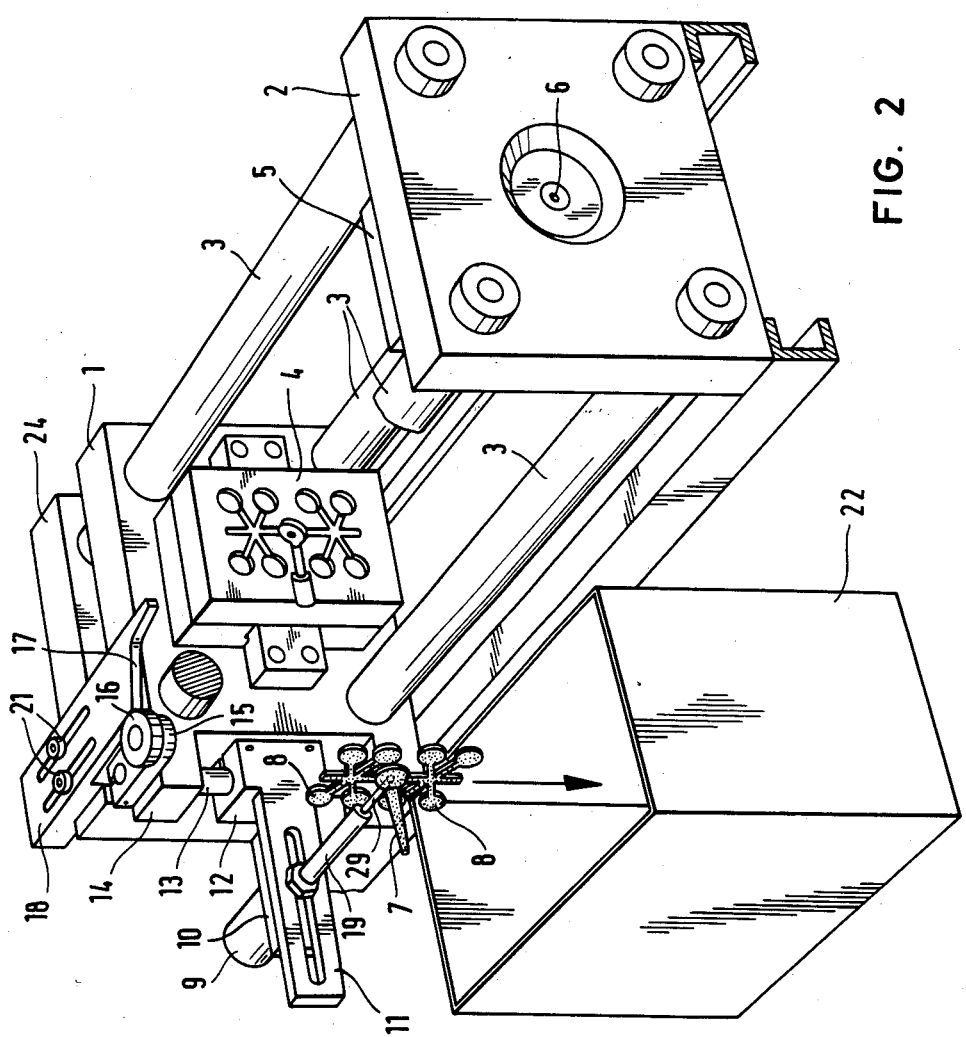
FIG. 2 shows the same apparatus after and during the ejection.
Figure 3:
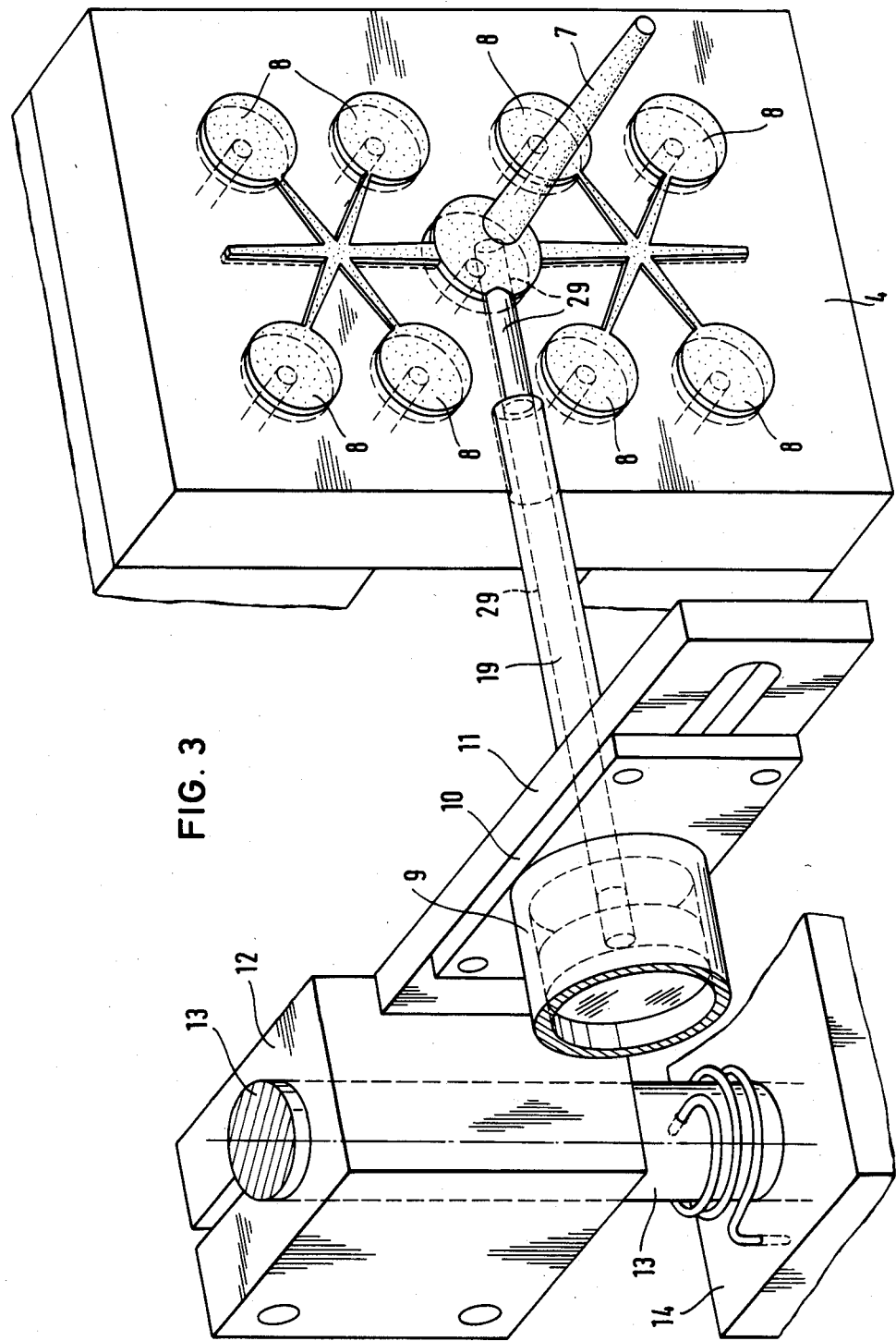
FIG. 3 is an enlarged view showing a part of FIG. 1.

If this is not permitted by the space conditions, the cylinder 9 and the sprue carried by the end of the piston rod 29 are pivoted by means of the arm 11 and the shaft 13 so that the sprue is laterally moved to a larger extent out of the region of the machine and drops into a collecting bin 22, which in that case stands beside the machine, as shown in FIG. 2.

In that case the crossbeam 18 is so adjusted that the roller 16 will engage the cam 17 on the lever arm 15 before the mold is opened as far as possible and the shaft 13 and the cylinder 9 will be pivoted through 90 to 180 degrees. As a result the sprue is moved entirely out of the region of the mold and of the means for clamping the mold and can then be stripped off as the piston rod 29 is retracted.

It will obviously be possible to provide different means for imparting the pivotal movement, for instance a rack-and-pinion drive or a push rod or a separate electric, hydraulic or pneumatic drive.

The apparatus may be mounted on any of three sides of the platen.

As the mold is closed, the apparatus is pivoted back to its initial position shown in FIG. 1 so that the end of the piston rod 29 again extends into the runner and molding material will again be molded around the end of the piston rod during the next cycle of operation and the end of the piston rod 29 will then again be stuck in the sprue. All movements are automatically controlled in dependence on the speed of operation of the machine and are integrated in the injection molding process.

I claim:

1. In an injection molding machine having two mold halves and means for moving the mold halves relative to each other in an axial direction, an apparatus for removing a sprue from the molding machine, said apparatus comprising: a cylinder, an associated piston rod connected to said cylinder, said piston rod having a front end, means for extending the front end of the piston rod from the cylinder transversely to the axial direction and between said two mold halves into a space forming the sprue so that during injection molding material will be molded around the front end of said piston rod and form the sprue, and means for retracting the piston rod with the sprue, upon separation of the mold halves, into the cylinder and for separating the sprue from the front end of said piston rod.

2. An apparatus according to claim 1, wherein the molding machine has a movable platen connected to one of the mold halves, and wherein the cylinder is connected to the movable platen.

3. An apparatus according to claim 1, wherein a guide tube surrounds the piston rod, so that said guide tube separates said sprue from the front end of said piston rod when said piston rod is retracted.

4. An apparatus according to claim 2, wherein a guide tube surrounds the piston rod, so that said guide tube separtes said sprue form the front end of said piston rod when said piston rod is retracted.

5. An apparatus according to claim 1, comprising means for positioning the cylinder relative to the mold halves in three mutually orthogonal directions, and means for fixing the cylinder in position.

6. An apparatus according to claim 2, comprising means for positioning the cylinder relative to the mold halves in three mutually orthogonal directions, and means for fixing the cylinder in position.

7. An apparatus according to claim 3, comprising means for positioning the cylinder relative to the mold halves in three mutually orthogonal directions, and means for fixing the cylinder in position.

8. An apparatus according to claim 4, comprising means for positioning the cylinder relative to the mold halves in three mutually orthogonal directions, and means for fixing the cylinder in position.

9. An apparatus according to any one of claims 6 to 8, wherein said means for positioning the cylinder comprises a shaft mounted on the movable platen, and about which said cylinder is rotatable.

10. An apparatus according to claim 9, wherein said shaft extends vertically, a bushing movable along said shaft, and means for fixing the bushing in position on said shaft, said bushing carrying a horizontal arm, said cylinder being movable along said arm.

11. An apparatus according to claim 10, comprising a carrier plate carrying said cylinder, and means for fixing the carrier plate in position on said arm.

12. An apparatus according to claim 9, in a molding machine having a stationary bridge, said apparatus comprising a cam mounted on said bridge and adjustable relative thereto in the axial direction of the runner, a lever arm connected to said shaft, and a roller on said lever arm and cooperating with said cam.

* * * * *